United States Patent [19]
Pandey

[11] Patent Number: 6,046,698
[45] Date of Patent: *Apr. 4, 2000

[54] INDOOR RADIO FREQUENCY COVERAGE TOOL

[75] Inventor: Chandra Shekhar Pandey, Woodridge, Ill.

[73] Assignee: Lucent Technologies, Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/964,616

[22] Filed: Nov. 5, 1997

[51] Int. Cl.[7] .............................. H01Q 3/00; H04M 9/00
[52] U.S. Cl. ........................... 342/360; 455/423; 455/446
[58] Field of Search ................................. 342/360, 357, 342/357.14; 455/446, 423; 701/25, 27, 216, 210, 23

[56] References Cited

U.S. PATENT DOCUMENTS

| | | | |
|---|---|---|---|
| 4,084,241 | 4/1978 | Tsumura | 342/452 |
| 4,480,310 | 10/1984 | Alvarez | 701/217 |
| 4,977,399 | 12/1990 | Price et al. | 340/825.44 |
| 5,073,749 | 12/1991 | Kanayama | 318/587 |
| 5,294,937 | 3/1994 | Ostteen et al. | 342/357 |
| 5,398,276 | 3/1995 | Lemke et al. | 379/21 |
| 5,463,673 | 10/1995 | Herscovici | 455/62 |
| 5,696,675 | 12/1997 | Nakamura et al. | 364/424.027 |
| 5,711,388 | 1/1998 | Davies et al. | 180/168 |

*Primary Examiner*—Gregory C. Issing

[57] ABSTRACT

A tool for gathering empirical RF signal quality measurements that are accurately correlated with the position at which they are made is disclosed. In particular, the tool is particularly useful indoors where satellite positioning system receivers often cannot be used. This advantage is found in an illustrative embodiment of the present invention in which the illustrative embodiment uses the technique of dead reckoning to determine the position at which RF signal quality measurements are made by estimating a new position based on an old position and an estimate of the course and distance traveled since the old position.

13 Claims, 5 Drawing Sheets

INDOOR RADIO FREQUENCY COVERAGE TOOL

FIELD OF THE INVENTION

The present invention relates to wireless telecommunications in general, and, more particularly, to a tool for measuring the radio frequency coverage of an indoor wireless telecommunications system.

BACKGROUND OF THE INVENTION

Figure 1:
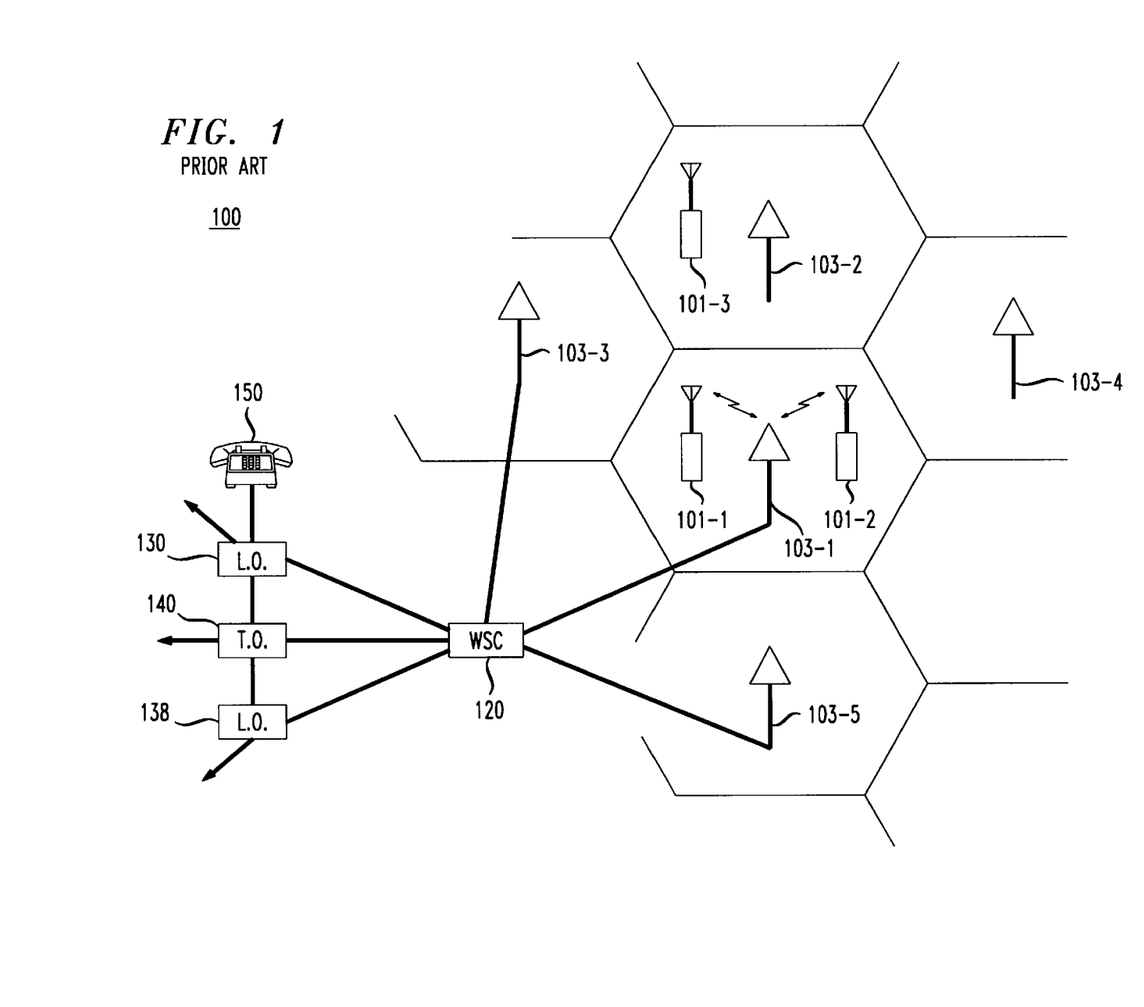
FIG. 1 depicts a schematic diagram of a wireless telecommunications system in the prior art.

FIG. 1 depicts a schematic diagram of a portion of a typical wireless telecommunications system in the prior art, which system provides wireless telecommunications service to a number of wireless terminals (e.g., wireless terminals 101-1 through 101-3) that are situated within a geographic region. The heart of a typical wireless telecommunications system is Wireless Switching Center ("WSC") 120, which may be known also as a Mobile Switching Center ("MSC") or Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to local- and long-distance telephone offices (e.g., local-office 130, local-office 138 and toll-office 140). Wireless Switching Center 120 is responsible for, among other things, establishing and maintaining calls between wireless terminals and between a wireless terminal and a wireline terminal, which is connected to the system via the local and/or long distance networks.

The geographic area serviced by a wireless telecommunications system is partitioned into a number of spatially distinct areas called "cells." As depicted in FIG. 1, each cell is schematically represented by a hexagon; in practice, however, each cell usually has an irregular shape that depends on the topology of the terrain serviced by the system. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120. Upon receipt of the information, and with the knowledge that it is intended for wireless terminal 101-2, Wireless Switching Center 120 then returns the information back to base station 103-1, which relays the information, via radio, to wireless terminal 101-2.

Indoor wireless telecommunications has been the subject of intense investigation in recent years for both voice and data communication. One particular area of investigation is how to ensure the adequate propagation of a wireless signal from a base station to a wireless terminal through a typical indoor environment. The walls, furniture and other objects in a typical indoor environment scatter the wireless signal and thus produce a complex multipath channel in which the signal propagation characteristics are substantially more difficult to predict than those in outdoor contexts.

Typically, the signal propagation characteristics are considered when designing and installing an indoor wireless telecommunications system. In particular, the signal propagation characteristics are advantageously considered when determining how many base stations are needed to provide coverage for a building and where in the building those base stations should be located. Because base stations are typically expensive to install and operate, it is advantageous to be able to determine how to provide the necessary coverage for the building with the fewest number of base stations. To do this, several techniques have been developed for modeling the propagation of wireless signals indoors.

One technique in the prior art for measuring and modeling indoor signal propagation is adapted from the power-law decay model used in modeling outdoor environments. The power-law decay model assumes that the base station's antenna is high above the ground and that there is line-of-sight propagation to the wireless terminal. In this case, the mean power, P, received at the wireless terminal decays in inverse proportion to the square of the distance from the transmitter, $$P \propto \frac{1}{r^2}, \tag{Eq. 1}$$

up to some break-point. Beyond that breakpoint, the mean power at the wireless terminal decays in inverse proportion to the fourth power of the distance from the transmitter:

$$P \propto \frac{1}{r^4} \tag{Eq. 2}$$

The location of the break-point is determined by the location at which the ground bounce signal interferes with the line-of-sight signal. For indoor environments, Equation 1 has been adapted to Equation 3, where $\gamma$ is fit to empirical trial measurements of the building of interest, in well-known fashion:

$$P \propto \frac{1}{r^\gamma} \tag{Eq. 3}$$

Although more sophisticated RF propagation models exist, the efficacy of any model is premised on empirical RF signal quality measurements that are accurately correlated with the position at which the measurements are made. Outdoors, an RF signal quality meter is used in conjunction with a satellite positioning system receiver (e.g., a Global Positioning System receiver, etc.) to take signal quality measurements that are correlated to the position at which the measurement is made. Indoors, however, it is typically difficult to gather RF signal quality measurements that are accurately correlated with the position at which they are made.

Figure 2:
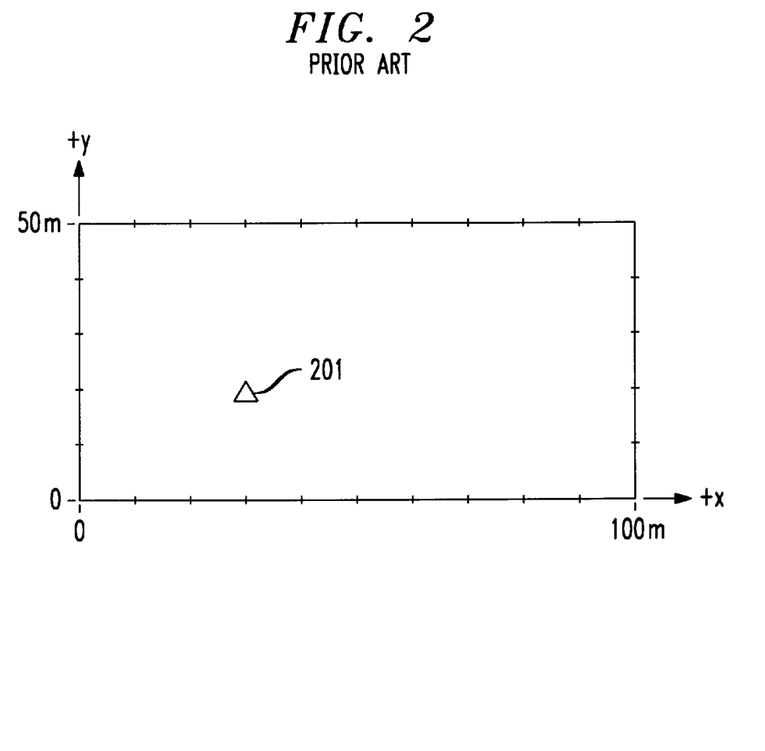
FIG. 2 depicts a floor plan of a typical building in the prior art.

For example, FIG. 2 depicts a floor plan of an illustrative floor of a rectangular building, whose floor plan has been superimposed onto an x-y coordinate system. The building is 50 meters in the y-direction and 100 meters in the x-direction, and the floor of interest contains one wireless base station, base station 201, at location x=30, y=25, that radiates its signal with +20 dBm of power. Through experience, it has been observed that base station 201 is insufficient to provide satisfactory coverage throughout floor 200.

Typically, coverage is insufficient when there are areas in floor 200 in which the signal strength is below −65 dBm. A typical question is whether two similar base stations, one at x=25, y=50, and the other x=75, y=50, will provide at least −65 dBm of coverage throughout the building. Traditionally, this question would be answered by taking RF signal quality measurements of floor 200 and then answering the question based on the measurements and an indoor RF propagation model. Typically, however, the signals transmitted from a satellite positioning system are too attenuated by the walls of the building to be received by a satellite positioning system receiver, and, therefore, while it is easy to gather RF signal quality measurements in floor 200, it is problematic to accurately correlate them with position.

Therefore, the need exists for a tool that is capable of gathering empirical RF signal quality measurements and of accurately correlating those measurements with the position at which they are made.

SUMMARY OF THE INVENTION

Some embodiments of the present invention are capable of gathering RF signal quality measurements that are accurately correlated with the position at which they are made without the limitations and disadvantages of techniques in the prior art. In particular, embodiments of the present invention are capable of gathering RF signal quality measurements and of accurately correlating those measurements with the position at which they are made, indoors, without the use of a satellite positioning system receiver.

This advantage is found in an illustrative embodiment of the present invention, which uses the technique of "dead reckoning" to determine the position at which RF signal quality measurements are made by estimating a new position based on an old position and an estimate of the course and distance traveled since the old position.

The illustrative embodiment comprises: a frame; an axle attached to the frame; a first wheel and a second wheel on the axle; a first sensor for determining a measure of how far the first wheel turns in an interval, $\Delta\theta_L(n)$, a second sensor for determining a measure of how far the second wheel turns in the interval, $\Delta\theta_R(n)$; a signal quality meter mounted on the frame for determining a measure of signal quality of an RF signal in the interval, SQ(n); and a recorder for recording the measure of how far the first wheel turns in an interval, $\Delta\theta_L(n)$, the measure of how far the second wheel turns in the interval, $\Delta\theta_R(n)$, and the measure of signal quality of an RF signal in the interval, SQ(n).

The illustrative embodiment is advantageously wheeled throughout the floor of interest while signal quality measurements are being made. The illustrative embodiment then uses the measures $\Delta\theta_L(n)$ and $\Delta\theta_R(n)$, through dead reckoning, to estimate the path taken inside the building and the position at which each signal quality measurement, SQ(n), is made.

In an another embodiment of the present invention, the first position of the embodiment is determined, outside, with a satellite positioning system receiver, before the embodiment is wheeled inside to begin the process of gathering RF signal quality measurements.

DETAILED DESCRIPTION

Figure 3:
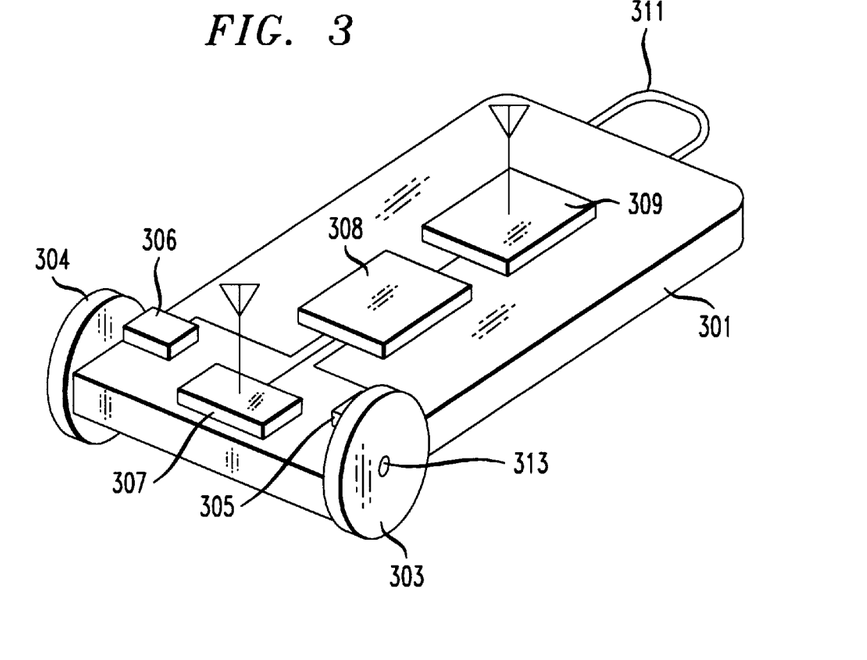
FIG. 3 depicts an isometric drawing of the illustrative embodiment of the present invention.
Figure 4:
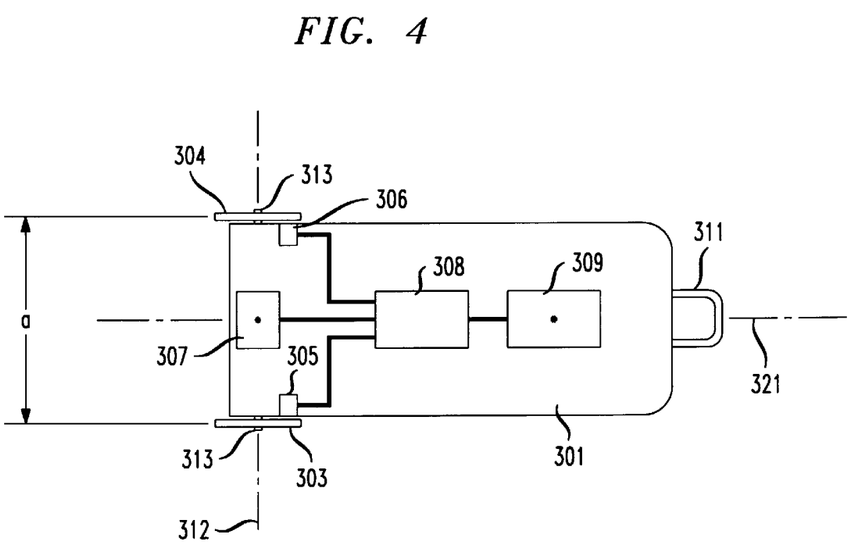
FIG. 4 depicts a top-view drawing of the illustrative embodiment of the present invention.
Figure 5:
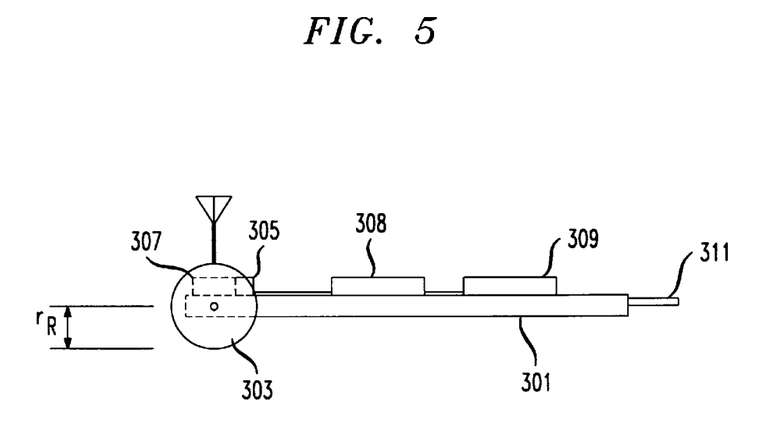
FIG. 5 depicts a side-view drawing of the illustrative embodiment of the present invention.

FIG. 3 depicts an isometric drawing of the illustrative embodiment of the present invention, which is capable of measuring the signal quality of an RF signal at a variety of locations for the purpose of gathering data to produce a map of the RF signal quality with respect to position. FIG. 4 depicts a top-view drawing and FIG. 5 depicts a side-view drawing of the illustrative embodiment.

The illustrative embodiment resembles a two-wheeled hand-cart and can be conveniently pulled or pushed by a human being up and down the halls of a building and into and out of offices and other rooms.

Referring to FIG. 3, the illustrative embodiment advantageously comprises: frame 301, axle 313, right wheel 303, left wheel 304, right-wheel sensor 305, left-wheel sensor 306, signal quality meter 307, recorder/computer 308, satellite positioning system receiver 309 and handle 311.

Frame 301 provides the structural foundation for the illustrative embodiment and can be made of wood, metal, plastic or any other material that is strong enough to hold the other components. Advantageously, handle 311 is attached to frame 301 so that the illustrative embodiment can be easily pulled or pushed by a human being up and down the halls of a building and into and out of offices and other rooms.

Axle 313 is advantageously attached to one end of the frame, in well-known fashion, so that right wheel 303 and left wheel 304 can be mounted on axle 313 on opposite sides of frame 301. Left wheel 304 has a radius of $r_L$; right wheel 303 has a radius of $r_R$, and the distance between left wheel 304 and right wheel 303 is represented by a.

Alternatively, right wheel 303 and left wheel 304 can be mounted on axle 313 under frame 301, but in either case, it is advantageous that the radius of right wheel 303 and left wheel 304 extend beyond the lower end of frame 301, in well-known fashion, so as to ensure that right wheel 303 and left wheel 304 are always in contact with the floor. Advantageously, frame 301, axle 313, right wheel 303, left wheel 304, and handle 311 can be fabricated from a commonly available handcart, which can be purchased at most hardware stores.

Left-wheel sensor 306 is advantageously mounted on frame 301 and is capable of determining a measure of how far left wheel 304 turns in a given interval, $\Delta\theta_L(n)$, when n is a integer that is indicative of the particular interval. Similarly, right-wheel sensor 305 is advantageously mounted on frame 301 and is capable of determining a measure of how far right wheel 303 turns in the same interval, $\Delta\theta_R(n)$. Advantageously, the interval, n, is related to real time and left-wheel sensor 306 and right-wheel sensor 305 are capable of measuring how far their associated wheel turns in a short time interval (e.g., 5 milliseconds) with high accuracy (e.g., 0.001 radians or greater). In general, the efficacy of an embodiment of the present invention is limited by the accuracy with which left-wheel sensor 306 and right-wheel sensor 305 are capable of measuring how far their associated wheel turns and the interval n.

Alternatively, the interval n need not be defined in terms of time, but can, for example, be defined in terms of angular rotation of either left wheel 304 or right wheel 305. In other words, if the illustrative embodiment is motionless with respect to the ground, the interval need not be incremented. Instead, the interval can be incremented, and data collected, only when the illustrative embodiment is moving with respect to ground. Advantageously, however, the interval, n, is defined in terms of time and the illustrative embodiment records $\Delta\theta_L(n)$ and $\Delta\theta_R(n)$ an interval every 5 milliseconds or less.

Signal quality meter 307 advantageously is capable of making a measurement of the signal quality (e.g., signal-to-noise ratio, absolute power in dBm, etc.) of the RF signal of interest, in well-known fashion, and of outputting the measure of signal quality, SQ(n), as a function of the interval, n. Advantageously, signal quality meter 307 need not output a measure of signal quality every interval, but periodically or sporadically (e.g., once every 60 seconds, once for every 10,000 intervals in which $\Delta\theta_L(n)$ and $\Delta\theta_R(n)$ are recorded, etc.). It is essential, however, that the measure of signal quality, SQ(n), be correlated to the measures of $\Delta\theta_L(n)$ and $\Delta\theta_R(n)$.

The antenna associated with signal quality meter 307 is advantageously mounted in plane 321 (shown in FIG. 4), which is equidistant between left wheel 304 and right wheel 303. The antenna is also advantageously mounted above axle 313 so as to be capable of correlating, as close as possible, the position of right wheel 303 and left wheel 304 to the position of respective measures of signal quality, SQ(n).

Recorder/computer 308 advantageously is capable of receiving $\Delta\theta_L(n)$, $\Delta\theta_R(n)$, and SQ(n), and of recording them so that they are correlated and can be analyzed later to produce a map of signal quality as a function of position. Recorder/computer 308 is advantageously also capable of analyzing $\Delta\theta_L(n)$, $\Delta\theta_R(n)$, and SQ(n), and of producing a map of signal quality as a function of position, in accordance with the techniques described below and in well-known fashion.

Satellite positioning system receiver 309 advantageously is capable of determining the location of the illustrative embodiment with great accuracy and is used to calibrate the mapping process either before or after or before and after or intermittently during, if possible, the process of gathering data on $\Delta\theta_L(n)$, $\Delta\theta_R(n)$, and SQ(n). Satellite positioning system receiver 309 can be, for example, a Global Positioning System receiver, as is well known to those skilled in the art. The output of satellite positioning system receiver 309 is advantageously fed into recorder/computer 308 for processing. Furthermore, the antenna of satellite positioning system receiver 309 is advantageously mounted as close to the antenna of the signal quality meter as possible to ensure accuracy in the later produced maps, but not so close that the antennas cause interference in the other.

Advantageously, all of the active components in the illustrative embodiment operate on battery power, in well-known fashion.

Figure 6:
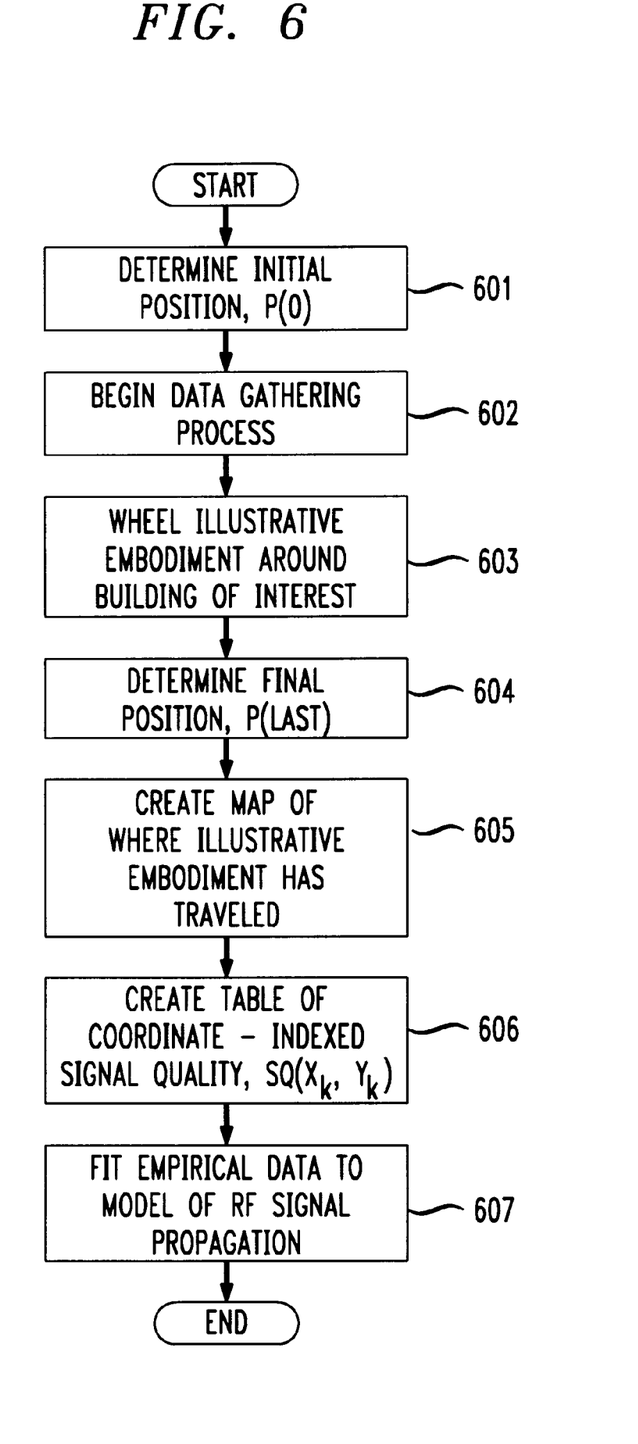
FIG. 6 depicts a flowchart of the operation of the illustrative embodiment of the present invention.

FIG. 6 depicts a flowchart of the operation of the illustrative embodiment of the present invention. At step 601, the illustrative embodiment is advantageously outdoors so that satellite positioning system receiver 309 can determine a known position, P(0), of the illustrative embodiment at interval zero (n=0).

At step 602, the process of data gathering begins and the illustrative embodiment is wheeled indoors. Advantageously, data for one floor of a building is gathered per test cycle, and step 601 is advantageously conducted in the same plane as the floor to be analyzed. Therefore, the illustrative embodiment is advantageously not wheeled or carried up stairs or ramps because the vertical displacement in the z-axis will be translated into rotation of left wheel 304 and right wheel 303, which will be incorrectly interpreted as motion in the x-y plane. In contrast, an elevator is an acceptable means for carrying the illustrative embodiment to another floor because the movement of the illustrative embodiment along the z-axis in the elevator does not cause rotation of either left wheel 304 or right wheel 303. At step 602, recorder/computer 308 begins recording the $\Delta\theta_L(n)$, $\Delta\theta_R(n)$, and SQ(n), as described above.

At step 603, the illustrative embodiment is wheeled up and down the halls of the floor of interest and into and out of offices and other rooms, so that data on SQ(n) can be obtained in a variety of locations.

At step 604, the process of gathering data on SQ(n) is stopped and the illustrative embodiment is again wheeled outdoors so that the last position, P(last), can be obtained again using satellite positioning system receiver 309.

At step 605, the process of creating a map of where the illustrative embodiment has traveled between step 601 and step 604 is performed. Advantageously, the illustrative embodiment uses the ancient technique of "dead reckoning," which is the technique of determining a new position based on an old position and an estimate of the course and distance traveled since the old position. In step 601, the position of the illustrative embodiment was determined by satellite positioning system receiver 309 at interval zero (0) as P(0). The position of the illustrative embodiment, P, is advantageously defined during interval, P(n), as the position of the antenna of signal quality meter 307, which is further defined as:

$$P(n) = \frac{P_L(n) + P_R(n)}{2} \tag{Eq. 4}$$

where $P_L(n)$ is defined as the position of left wheel 304 and $P_R(n)$ is defined as the position of right wheel 305 at interval n. In other words, the position of the illustrative embodiment is defined as halfway between right wheel 303 and left wheel 304.

The position of left wheel 304, $P_L(n)$, can be found from:

$$P_L(n) = P_L(n-1) + \vec{P}_L(n) \tag{Eq. 5a}$$

where $P_L(n-1)$ is the position of left wheel 304 during the previous interval and $\vec{P}_L(n)$ is a vector that is indicative of the motion of left wheel 304 during the interval n. Analogously, the position of right wheel 305, $P_R(n)$, can be found from:

$$P_R(n) = P_R(n-1) + \vec{P}_R(n) \tag{Eq. 5b}$$

where $P_R(n-1)$ is the position of right wheel 303 during the previous interval and $\vec{P}_R(n)$ is a vector that is indicative of the motion of right wheel 303 during the interval n.

The vector $\vec{P}_L(n)$ comprises: a magnitude of the motion of left wheel 304 during the interval n, which is represented by $m_L(n)$, and an angle, $\theta(n)$, which represents the direction that the illustrative embodiment traveled during interval n.

$$\vec{P}_L(n) = (m_L(n), \theta(n)) \tag{Eq. 6a}$$

Similarly, the vector $\vec{P}_R(n)$ comprises: a magnitude of the motion of right wheel 303 during the interval n, which is represented by $m_R(n)$, and an angle, $\theta(n)$, which represents the direction that the illustrative embodiment traveled during interval n.

$$\vec{P}_R(n) = (m_R(n), \theta(n)) \quad \text{(Eq. 6b)}$$

The angle, θ(n), in which the illustrative embodiment moves during interval n can be found from:

$$\theta(n) = \frac{m_L(n) - m_R(n)}{a} \quad \text{(Eq. 7)}$$

where a is the distance between left wheel 304 and right wheel 303.

Figure 7:
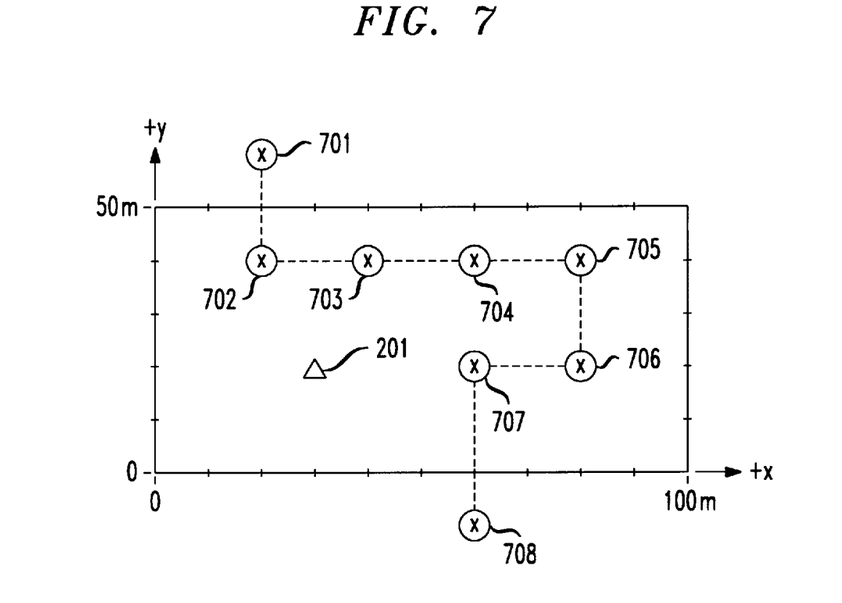
FIG. 7 depicts a map of floor 200 and the path the illustrative embodiment took and the points along the path at which signal quality measurements were made.

The magnitude of the motion of left wheel 304 during the interval n, $m_L(n)$, is determined by:

$$m_L(n) = \Delta\theta_L(n) r_L \quad \text{(Eq. 8a)}$$

where $r_L$ is the radius of left wheel 304 and $\Delta\theta_L(n)$ is the measure of the motion of left wheel 304, in radians. Similarly, the magnitude of the motion of right wheel 303 during the interval n, $m_R(n)$, is determined by:

$$m_R(n) = \Delta\theta_R(n) r_R \quad \text{(Eq. 8b)}$$

where $r_R$ is the radius of right wheel 303 and $\Delta\theta_R(n)$ is the measure of the motion of right wheel 303, in radians. By iteratively generating Eq. 4, a map of where the illustrative embodiment has traveled between step 601 and step 604 can be created, such as that depicted in FIG. 7. In FIG. 7, it can be seen that P(0) is at location 701, P(last) is at location 708, and that six sample measurements where taken at points 702 through 707.

Theoretically, the last point, P(last), determined iteratively from Eq. 4 will equal the last point determined from satellite positioning system receiver 309 in step 604. In practice, however, this is unlikely. In will be clear to those skilled in the art how to use the point, P(last), determined from satellite positioning system receiver 309 in step 604 to adjust earlier points determined from dead reckoning.

At step 606, the illustrative embodiment next coverts the k interval-indexed samples of signal quality, SQ(n), into coordinate-based data of signal quality, SQ(x, y), by relating SQ(n) to P(n), and creating a table of empirical signal quality measurements correlated to x-y coordinates. Table 1 depicts an illustration of such a table:

TABLE 1

| k | $x_k$ | $y_k$ | $SQ(x_k, y_k)$ |
|---|---|---|---|
| 1 | 20 | 40 | −50 dBm |
| 2 | 40 | 40 | −55 dBm |
| 3 | 60 | 40 | −65 dBm |
| 4 | 80 | 40 | −80 dBm |
| 5 | 80 | 20 | −65 dBm |
| 6 | 60 | 20 | −55 dbm |

Figure 8:
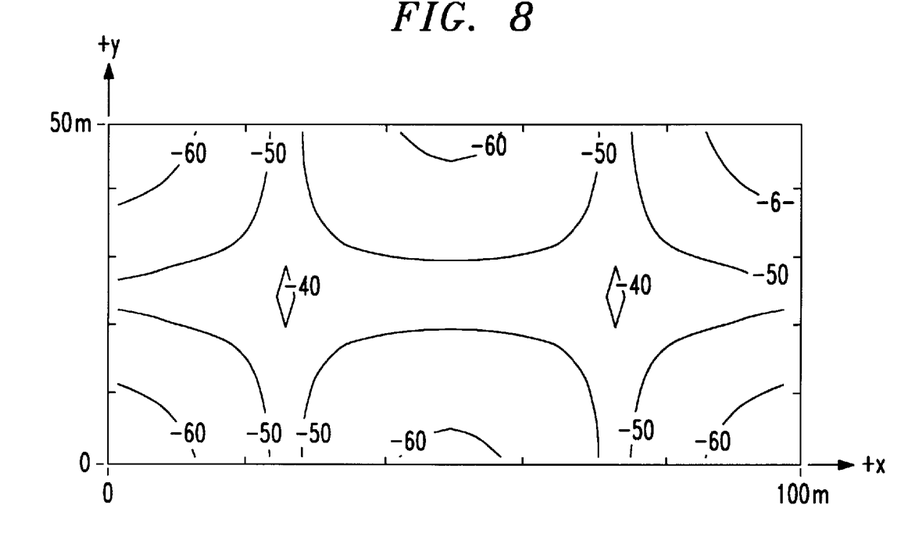
FIG. 8 depicts a map of RF signal quality that corresponds to the floor plan of FIG. 2.

At step 607, the table of empirical signal quality measurements is fit into a model of RF propagation, in a well known fasion and a map of signal quality for the floor of interest is generated, such as that shown in FIG. 8, which suggests that the two base stations will provide adequate coverage for floor 200. Pending U.S. patent application Ser. No. 08/933,493, entitled "Method and Apparatus for Modeling the propagation of Wireless Signals in Buildings, filed on Sep. 18, 1997 is incorporated by reference as if set forth in its entirety and describes step 607 in detail. It will be clear to those skilled in the art how to fit the empirical signal quality measurements into a model of RF propagation and to create a map of signal quality as shown in FIG. 8.

The map in FIG. 8 can then be used, in well-known fashion, to determine if there are regions within the floor of interest where the signal quality does not meet a minimum threshold.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. An apparatus comprising:

a frame;

an axle attached to said frame;

a first wheel and a second wheel on said axle;

a first sensor for determining a measure of how far said first wheel turns in an interval, $\Delta\theta_L(n)$, for n=0 to N, wherein n and N are integers;

a second sensor for determining a measure of how far said second wheel turns in said interval, $\Delta\theta_R(n)$;

a signal quality meter mounted on said frame for determining a measure of signal quality of an RF signal in said interval, SQ(n); and a recorder for recording said measure of how far said first wheel turns in an interval, $\Delta\theta_L(n)$, said measure of how far said second wheel turns in said interval, $\Delta\theta_R(n)$, and said measure of signal quality of an RF signal in said interval, SQ(n).

2. The apparatus of claim 1 wherein an antenna of said signal quality meter is mounted in a plane that is equidistant between said first wheel and said second wheel.

3. The apparatus of claim 2 wherein said antenna is mounted at a location in said plane such that:

a position of said right wheel during said interval n and a position of said left wheel during said interval n are correlatable to said measure of signal quality during said interval n.

4. The apparatus of claim 1 wherein said recorder correlates said measure of how far said first wheel turns in an interval, $\Delta\theta_L(n)$, said measure of how far said second wheel turns in said interval, $\Delta\theta_R(n)$, and said measure of signal quality of an RF signal in said interval, SQ(n).

5. The apparatus of claim 1 further comprising a computer for creating a map of signal quality based on said measure of how far said first wheel turns in an interval, $\Delta\theta_L(n)$, said measure of how far said second wheel turns in said interval, $\Delta\theta_R(n)$, and said measure of signal quality of an RF signal in said interval, SQ(n).

6. The apparatus of claim 1 further comprising:

a satellite positioning system receiver for determining a latitude during at least one time interval, Lat(n), and a longitude during said at least one time interval, Lon(n), and a computer for creating a map of signal quality based on said measure of how far said first wheel turns in an interval, $\Delta\theta_L(n)$, said measure of how far said second wheel turns in said interval, $\Delta\theta_R(n)$, and said measure of signal quality of an RF signal in said interval, SQ(n), said latitude during at least one time interval, Lat(n), and said longitude during said at least one time interval, Lon(n).

7. A method comprising:

measuring with a first sensor a measure of how far a first wheel turns in an interval, $\Delta\theta_L(n)$, for n=0 to N. wherein n and N are integers;

measuring with a second sensor a measure of how far said second wheel turns in said interval, $\Delta\theta_R(n)$;

measuring with a signal quality meter a measure of signal quality of an RF signal in said interval, SQ(n); and recording with a recorder said measure of how far said first wheel turns in an interval, $\Delta\theta_L(n)$, said measure of how far said second wheel turns in said interval, $\Delta\theta_R(n)$, and said measure of signal quality of an RF signal in said interval, $SQ(n)$.

8. The method of claim 7 further comprising the step of creating a map of signal quality based on said measure of how far said first wheel turns in an interval, $\Delta\theta_L(n)$, said measure of how far said second wheel turns in said interval, $\Delta\theta_R(n)$, and said measure of signal quality of an RF signal in said interval, $SQ(n)$.

9. The method of claim 7 further comprising the steps of:

determining a latitude during at least one time interval, $Lat(n)$, and a longitude during said at least one time interval, $Lon(n)$, and creating a map of signal quality based on said measure of how far said first wheel turns in an interval, $\Delta\theta_L(n)$, said measure of how far said second wheel turns in said interval, $\Delta\theta_R(n)$, and said measure of signal quality of an RF signal in said interval, $SQ(n)$, said latitude during at least one time interval, $Lat(n)$, and said longitude during said at least one time interval, $Lon(n)$.

10. An apparatus comprising:

a frame;

an axle attached to said frame;

a first wheel and a second wheel on said axle;

a first sensor for determining a measure of how far said first wheel turns in an interval, $\Delta\theta_L(n)$, for n=0 to N, wherein n and N are integers;

a second sensor for determining a measure of how far said second wheel turns in said interval, $\Delta\theta_R(n)$;

a signal quality meter mounted on said frame for determining a measure of signal quality of an RF signal in said interval, $SQ(n)$;

an antenna associated with said signal quality meter that is mounted in a plane that is equidistant between said first wheel and said second wheel; and a recorder for recording said measure of how far said first wheel turns in an interval, $\Delta\theta_L(n)$, said measure of how far said second wheel turns in said interval, $\Delta\theta_R(n)$, and said measure of signal quality of an RF signal in said interval, $SQ(n)$.

11. The apparatus of claim 10 wherein said recorder correlates said measure of how far said first wheel turns in an interval, $\Delta\theta_L(n)$, said measure of how far said second wheel turns in said interval, $\Delta\theta_R(n)$, and said measure of signal quality of an RF signal in said interval, $SQ(n)$.

12. The apparatus of claim 10 further comprising a computer for creating a map of signal quality based on said measure of how far said first wheel turns in an interval, $\Delta\theta_L(n)$, said measure of how far said second wheel turns in said interval, $\Delta\theta_R(n)$, and said measure of signal quality of an RF signal in said interval, $SQ(n)$.

13. The apparatus of claim 10 further comprising:

a satellite positioning system receiver for determining a latitude during at least one time interval, $Lat(n)$, and a longitude during said at least one time interval, $Lon(n)$, and a computer for creating a map of signal quality based on said measure of how far said first wheel turns in an interval, $\Delta\theta_L(n)$, said measure of how far said second wheel turns in said interval, $\Delta\theta_R(n)$, and said measure of signal quality of an RF signal in said interval, $SQ(n)$, said latitude during at least one time interval, $Lat(n)$, and said longitude during said at least one time interval, $Lon(n)$.

* * * * *